US011869093B2

(12) United States Patent
Kanevsky

(10) Patent No.: US 11,869,093 B2
(45) Date of Patent: *Jan. 9, 2024

(54) DRIVING PATTERNS

(71) Applicant: ALLSTATE INSURANCE COMPANY, Northbrook, IL (US)

(72) Inventor: Valery Alexander Kanevsky, Evanston, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/732,913

(22) Filed: Apr. 29, 2022

(65) Prior Publication Data

US 2022/0253947 A1 Aug. 11, 2022

Related U.S. Application Data

(63) Continuation of application No. 17/145,712, filed on Jan. 11, 2021, now Pat. No. 11,348,186, which is a continuation of application No. 14/152,427, filed on Jan. 10, 2014, now Pat. No. 10,902,521.

(51) Int. Cl.
    *G06Q 40/08* (2012.01)
(52) U.S. Cl.
    CPC .................... *G06Q 40/08* (2013.01)
(58) Field of Classification Search
    None
    See application file for complete search history.

(56) References Cited

U.S. PATENT DOCUMENTS

| 5,084,821 | A | 1/1992 | Ohsuga et al. |
| 5,172,785 | A | 12/1992 | Takahashi |
| 5,289,183 | A | 2/1994 | Tassett et al. |
| 6,064,970 | A | 5/2000 | McMillan et al. |
| 6,198,996 | B1 | 3/2001 | Berstis |
| 6,502,035 | B2 * | 12/2002 | Levine .................. G08G 1/205 340/467 |

(Continued)

FOREIGN PATENT DOCUMENTS

DE 212008000095 U1 9/2010

OTHER PUBLICATIONS

Mar. 10, 2021—U.S. Notice of Allowance—U.S. Appl. No. 15/964,611.

(Continued)

*Primary Examiner* — Christopher Bridges
(74) *Attorney, Agent, or Firm* — Dinsmore & Shohl LLP

(57) ABSTRACT

A computing system may be configured to receive and analyze movement data. A stopping point within the movement data may be determined. Additional data related to the determined stopping point may be received from one or more roadway infrastructure devices. A time interval of data may be determined and analyzed based on the additional data. A driving pattern may be determined based on the analyzed determined time interval of data. A driver of a driving trip may be determined based on the driving pattern. Data corresponding to the driver and the driving trip may be outputted. Drivers associated with driving trips may be identified based on the movement data. In some cases, a driving pattern may be determined based on the movement data.

20 Claims, 4 Drawing Sheets

(56) References Cited

U.S. PATENT DOCUMENTS

| | | | |
|---|---|---|---|
| 6,573,929 B1* | 6/2003 | Glier | G08G 1/054 |
| | | | 348/149 |
| 6,758,089 B2* | 7/2004 | Breed | G08G 1/096783 |
| | | | 73/146 |
| 6,763,300 B2* | 7/2004 | Jones | G06Q 10/08 |
| | | | 701/465 |
| 6,810,309 B2 | 10/2004 | Sadler et al. | |
| 7,003,289 B1 | 2/2006 | Kolls | |
| 7,821,421 B2* | 10/2010 | Tamir | H01L 23/49838 |
| | | | 340/901 |
| 7,889,078 B2 | 2/2011 | Hovden | |
| 7,979,207 B2 | 7/2011 | Chowdhary et al. | |
| 8,065,169 B1 | 11/2011 | Oldham et al. | |
| 8,140,241 B2 | 3/2012 | Takeda et al. | |
| 8,254,011 B2 | 8/2012 | Baur et al. | |
| 8,255,990 B2 | 8/2012 | Callenryd et al. | |
| 8,256,560 B2 | 9/2012 | Fiske et al. | |
| 8,344,849 B2 | 1/2013 | Larsson et al. | |
| 8,525,668 B1 | 9/2013 | Alouani et al. | |
| 8,738,523 B1 | 5/2014 | Sanchez et al. | |
| 8,791,806 B2 | 7/2014 | Granruth | |
| 8,989,914 B1* | 3/2015 | Nemat-Nasser | G07C 5/08 |
| | | | 701/1 |
| 9,081,650 B1 | 7/2015 | Brinkmann et al. | |
| 9,589,393 B2 | 3/2017 | Botnen | |
| 2003/0043059 A1 | 3/2003 | Miller | |
| 2004/0252193 A1 | 12/2004 | Higgins | |
| 2005/0080641 A1 | 4/2005 | Ronning et al. | |
| 2006/0555551 | 3/2006 | Fries | |
| 2007/0001831 A1 | 1/2007 | Raz et al. | |
| 2007/0027583 A1 | 2/2007 | Tamir et al. | |
| 2008/0136670 A1 | 6/2008 | Tengler et al. | |
| 2008/0167774 A1 | 7/2008 | Patel et al. | |
| 2008/0255888 A1 | 10/2008 | Berkobin et al. | |
| 2009/0048750 A1* | 2/2009 | Breed | G08G 1/161 |
| | | | 701/70 |
| 2011/0035139 A1 | 2/2011 | Konlditslotis et al. | |
| 2011/0182238 A1 | 7/2011 | Marshall et al. | |
| 2012/0004933 A1 | 1/2012 | Foladare et al. | |
| 2012/0029801 A1 | 2/2012 | Yano et al. | |
| 2012/0095670 A1 | 4/2012 | Piggott | |
| 2012/0173195 A1 | 7/2012 | Opshaug et al. | |
| 2012/0209632 A1 | 8/2012 | Kaminski et al. | |
| 2012/0221228 A1 | 8/2012 | Noumura et al. | |
| 2012/0226421 A1 | 9/2012 | Kote et al. | |
| 2012/0245839 A1 | 9/2012 | Syed et al. | |
| 2012/0307064 A1 | 12/2012 | Schenken et al. | |
| 2013/0041521 A1 | 2/2013 | Basir et al. | |
| 2013/0059607 A1* | 3/2013 | Herz | H04L 67/12 |
| | | | 455/456.3 |
| 2013/0097037 A1 | 4/2013 | Gospodarek et al. | |
| 2013/0141576 A1 | 6/2013 | Lord et al. | |
| 2013/0166201 A1 | 6/2013 | Paim et al. | |
| 2013/0166326 A1 | 6/2013 | Lavie et al. | |
| 2013/0176328 A1 | 7/2013 | Pillai | |
| 2013/0253732 A1 | 9/2013 | Patel et al. | |
| 2013/0302758 A1 | 11/2013 | Wright | |
| 2013/0316310 A1 | 11/2013 | Musicant et al. | |
| 2014/0058761 A1* | 2/2014 | Freiberger | G06Q 50/30 |
| | | | 705/4 |
| 2014/0080100 A1 | 3/2014 | Phelan et al. | |
| 2014/0089168 A1 | 3/2014 | Metz-Galloway et al. | |
| 2014/0106732 A1* | 4/2014 | Silver | G06F 16/24578 |
| | | | 455/418 |
| 2014/0149145 A1 | 5/2014 | Peng et al. | |
| 2014/0350777 A1 | 11/2014 | Kawai et al. | |
| 2014/0358358 A1 | 12/2014 | Jones et al. | |
| 2015/0039348 A1 | 2/2015 | Miller et al. | |
| 2015/0154711 A1 | 6/2015 | Christopulos et al. | |
| 2015/0187013 A1 | 7/2015 | Adams et al. | |
| 2015/0193885 A1 | 7/2015 | Akvia et al. | |
| 2015/0312404 A1 | 10/2015 | Abramson et al. | |
| 2017/0097243 A1 | 4/2017 | Ricci | |

OTHER PUBLICATIONS

"Biometric Identification Using Driving Behavioral Signals"; Kei Igarashi et al.; Publication0-7803-8603-5/04/$20.00 A (c) 2004 IEEE.

"Parametric Versus No-parametric Models of Driving Behavior Signals for Driver Identification"; webpage link.springerr.com/chapter/10.10072F11527923_77; dated Jun. 10, 2013.

"Driving Identification Using Driving Behavior Signals"; webpage www.researchgate.net/publication/31157945_Driver_Identification_Using_Driving_Behavior_Signals; dated Jun. 10, 2013.

"Driving Recognition Using Gaussian Mixture Models and Decision Fusion Techniques"; Kristin S. Benli et al.; date assessed Jun. 10, 2013.

"Driver Modeling Based on Driving Behavior and Its Evaluation in Driver Identification"; Miyajima et al.; Proceedings of the IEEE (vol. 95, Issue 2); Published Feb. 2007, ISSN: 0018-9219.

"Support Vector Machine for Behavior-Based Driver Identification System"; Huihuan Qian et al.; Journal of Robotics: vol. 2010, Article ID 397865, Hindawi Publishing Coporation, Mar. 2010.

"Video-Based Driver Identification Using Local Appearance Face Recognition"; J. Stallkamp et al.; date assessed Jun. 10, 2013.

"Experiments on Decision Fusion for Driver Recognition"; Hakan Erdogan et al.; Document from Faculty of Engineering; date assessed Jun. 10, 2013.

"Driver Identification Based on Spectral Analysis of Driving Behavioral Signals"; Webpage http://link.springer.com/chapter/10.1007/978-0-387-45976-9_3; date capture Jan. 10, 2014.

Jan. 8, 2015—U.S. Non-Final Office Action—U.S. Appl. No. 14/152,427.

Jun. 26, 2015—U.S. Final Office Action—U.S. Appl. No. 14/152,427.

Dec. 23, 2015—U.S. Non-Final Office Action—U.S. Appl. No. 14/152,427.

Jul. 14, 2015—U.S. Non-Final Office Action—U.S. Appl. No. 14/152,427.

Dec. 17, 2015—U.S. Final Office Action—U.S. Appl. No. 14/152,458.

Mar. 21, 2016—U.S. Non-Final Office Action—U.S. Appl. No. 14/152,458.

May 25, 2016—U.S. Final Office Action—U.S. Appl. No. 14/152,427.

Aug. 9, 2016—U.S. Non-Final Office Action—U.S. Appl. No. 14/152,458.

Dec. 22, 2016—Final Office Action—U.S. Appl. No. 14/152,458.

Feb. 22, 2017—U.S. Non-Final Office Action—U.S. Appl. No. 14/152,427.

May 11, 2017—U.S. Non-Final Office Action—U.S. Appl. No. 14/152,458.

Aug. 4, 2017—U.S. Final Office Action—U.S. Appl. No. 14/152,427.

Nov. 9, 2017—U.S. Final Office Action—U.S. Appl. No. 14/152,458.

Feb. 1, 2018—U.S. Notice of Allowance—U.S. Appl. No. 14/152,458.

Jun. 13, 2018—U.S. Non-Final Office Action—U.S. Appl. No. 14/152,427.

Jan. 10, 2019—U.S. Final Office Action—U.S. Appl. No. 14/152,427.

Oct. 3, 2019—U.S. Non-Final Office Action—U.S. Appl. No. 14/152,427.

Apr. 8, 2020—U.S. Final Office Action—U.S. Appl. No. 14/152,427.

Jul. 14, 2020—U.S. Notice of Allowance—U.S. Appl. No. 14/152,427.

Sep. 9, 2016—U.S. Non-Final Office Action—U.S. Appl. No. 14/158,388.

Apr. 7, 2017—U.S. Final Office Action—U.S. Appl. No. 14/158,388.

Sep. 11, 2017—U.S. Non-Final Office Action—U.S. Appl. No. 14/158,388.

Jan. 12, 2018—U.S. Final Office Action—U.S. Appl. No. 14/158,388.

Oct. 4, 2018—U.S. Non-Final Office Action—U.S. Appl. No. 14/158,388.

May 15, 2019 U.S. Notice of Allowance and Fees Due—U.S. Appl. No. 14/158,388.

Feb. 6, 2020—U.S. Non-Final Office Action—U.S. Appl. No. 16/531,563.

May 8, 2020—U.S. Notice of Allowance—U.S. Appl. No. 16/531,563.

Sep. 4, 2020—U.S. Notice of Allowance—U.S. Appl. No. 14/152,427.

(56) References Cited

OTHER PUBLICATIONS

Nov. 24, 2020—U.S. Non-Final Office Action—U.S. Appl. No. 15/964,611.

* cited by examiner

DRIVING PATTERNS

CROSS REFERENCE TO RELATED APPLICATIONS

This application is a continuation application of U.S. patent application Ser. No. 17/145,712 filed on Jan. 11, 2021, which is a continuation application of U.S. patent application Ser. No. 14/152,427 filed on Jan. 10, 2014 and entitled "Driving Patterns". The entire contents of this application is incorporated herein by reference in its entirety.

TECHNICAL FIELD

Various aspects of the disclosure generally relate to systems and methods of collecting and analyzing driving data. Specifically, various aspects relate to systems and methods of receiving and analyzing movement data collected by movement sensors at a mobile computing device, and identifying driving patterns and associated drivers based on the movement data.

BACKGROUND

The ability to collect and analyze driving data and driving behaviors associated with vehicles and drivers has many valuable applications, for example, relating to vehicle and driver insurance, vehicle financing, product safety and marketing, government and law enforcement, and various other applications in other industries. For example, an insurance company may offer a safe driving discount, and a financial institution may offer financing incentives to customers based on driving behavior. Law enforcement or governmental personnel may collect and analyze driving data to identify dangerous driving roads or times, detect moving violations and other unsafe driving behaviors. In other cases, driving data may be used for navigation applications, vehicle tracking and monitoring applications, and vehicle maintenance applications, product sales and targeting advertisement applications, among others.

Vehicle-based computer systems, such as on-board diagnostics (OBD) systems and telematics devices, may be used in automobiles and other vehicles, and may be capable of collecting various driving data. For example, OBD systems may receive information from the vehicle's on-board computers and sensors in order to monitor a wide variety of information relating to the vehicle systems, such as engine RPM, emissions control, vehicle speed, throttle position, acceleration and braking rates, use of driver controls, etc. Vehicles may also include Global Positioning System (GPS) receivers and devices installed within or operating at the vehicle configured to collect vehicle location and time data. Such vehicle-based systems may be capable of collecting driving data which may be used to perform various driving data analyses such as statistical driving evaluations, driver score calculations, etc. However, not all vehicles are equipped with systems capable of collecting, analyzing, and communicating driving data. Moreover, a single vehicle may be used by multiple different drivers, and conversely, a single driver may drive multiple different vehicles. Thus, driving data collected by a vehicle-based system might not completely and accurately reflect a driver's driving behavior.

In contrast to vehicle-based systems, mobile devices such as smartphones, personal digital assistants, tablet computers, and the like, are often carried and/or operated by a single user. Some mobile devices may include one or more movement sensors, such as an accelerometer, gyroscope, speedometer, and/or GPS receivers, capable of detecting movement.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, apparatuses, computer-implemented methods, and computer-readable media for receiving and analyzing movement data and identifying driving patterns and drivers based on the movement data. In some cases, the movement data may correspond to acceleration data, speed data, location data (e.g., GPS data), or other movement data collected by various movement sensors in one or more mobile devices, such as smartphones, tablet computers, and on-board vehicle systems.

According to some aspects of the disclosure, driving patterns may be determined based on statistical analyses of the movement data. Specific portions of the movement data may be analyzed corresponding to certain times during a driving trip, such as time windows immediately before or after various stopping points during a driving trip. After determining a driving pattern, the pattern may be compared to one or more additional previously-stored driving patterns associated with a plurality of different drivers.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
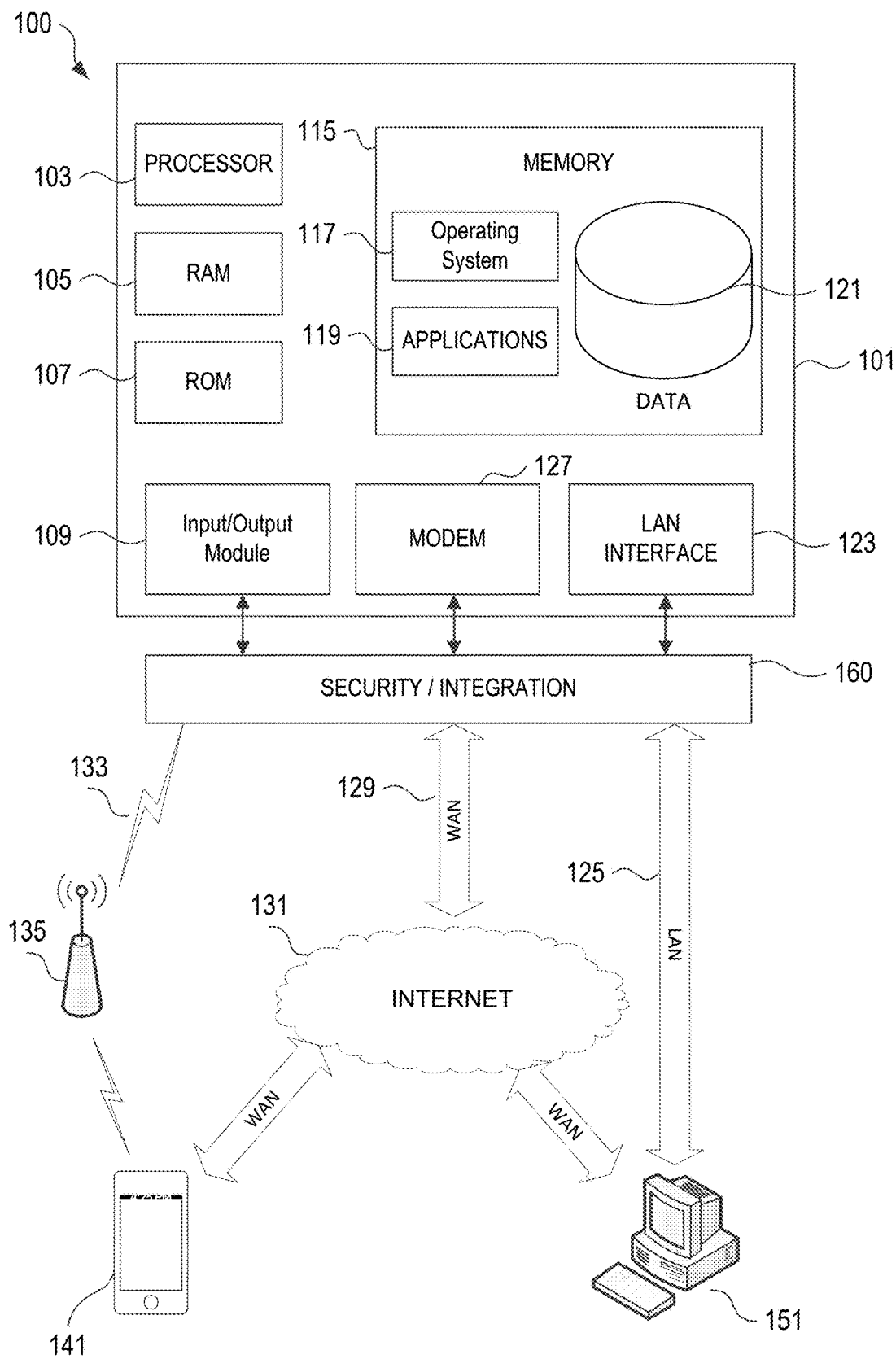
FIG. 1 illustrates a network environment and computer systems that may be used to implement aspects of the disclosure.

FIG. 1 illustrates a block diagram of a computing device (or system) 101 in a computer system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices, such as a mobile computing device or a driving data analysis server, configured as described herein for receiving and analyzing movement data from mobile device movement sensors, and identifying driving patterns and drivers associated with the movement data.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer readable instructions, data structures, program modules or other data. Certain devices/systems within a movement data/driving data analysis system may have minimum hardware requirements in order to support sufficient storage capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., an insurance provider server 101, a movement data/driving data analysis device 101, etc.), in order to store and/or execute a movement data analysis software application, receive and process sufficient amounts of movement data from various sensors at a determined data sampling rate, and analyze movement data to identify driving patterns and determine associated drivers, etc. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, to execute a movement data analysis software application that receives and stores data from mobile device movement sensors, analyzes the movement data, and determines driving patterns and associated drivers based on the movement data.

The computing device (e.g., a mobile computing device, a driving data analysis server, etc.) may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, on-board vehicle computing systems, and the like), and may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, portable customer computing devices, on-board vehicle computing systems, etc.) via one or more network devices 135 (e.g., base transceiver stations) in the wireless network 133.

Also illustrated in FIG. 1 is a security and integration layer 160, through which communications may be sent and managed between the device 101 (e.g., a user's mobile device, a driving data analysis system, etc.) and the remote devices (141 and 151) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a driving data analysis server operated by an insurance provider, financial institution, governmental entity, or other organization, may comprise a set of web application servers configured to use secure protocols and to insulate the server 101 from external devices 141 and 151. In some cases, the security and integration layer 160 may correspond to a set of dedicated hardware and/or software operating at the same physical location and under the control of same entities as driving data analysis server 101. For example, layer 160 may correspond to one or more dedicated web servers and network hardware in an organizational datacenter or in a cloud infrastructure supporting a cloud-based driving data analysis system. In other examples, the security and integration layer 160 may correspond to separate hardware and software components which may be operated at a separate physical location and/or by a separate entity.

As discussed below, the data transferred to and from various devices in the computing system 100 may include secure and sensitive data, such as movement data, driving pattern data, and/or driving behavior data associated with a driver or vehicle. Therefore, it may be desirable to protect transmissions of such data by using secure network protocols and encryption, and also to protect the integrity of the data when stored on in a database or other storage in a mobile device, driving data analysis server, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in a system 100. Data may be transmitted through the security and integration layer 160, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., movement data, location data, driving behavior data, etc.) between the various devices 101 in the system 100. Web services built to support system 100 may be cross-domain and/or cross-platform, and may be built for enterprise use. Such web services may be developed in accordance with various web service standards, such as the Web Service Interoperability (WS-I) guidelines. In some examples, a movement data and/or driving data web service may be implemented in the security and integration layer 160 using the Secure Sockets Layer (SSL) or Transport Layer Security (TLS) protocol to provide secure connections between servers 101 and various clients 141 and 151 (e.g., mobile devices, data analysis servers, etc.). SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a movement data database, a driving pattern database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of movement data and driving data collection and analysis systems, such as faster response times and less dependence on network conditions when transmitting/receiving movement data analysis software applications (or application updates), movement data, driving pattern data, etc.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119 may be used by the various computing devices 101 within a movement data and/or driving data analysis system 100 (e.g., movement data analysis software applications), including computer executable instructions for receiving and storing movement data from mobile device sensors, analyzing the movement data to identify driving patterns and drivers associated with the movement data, and performing other related functions as described herein.

Figure 2:
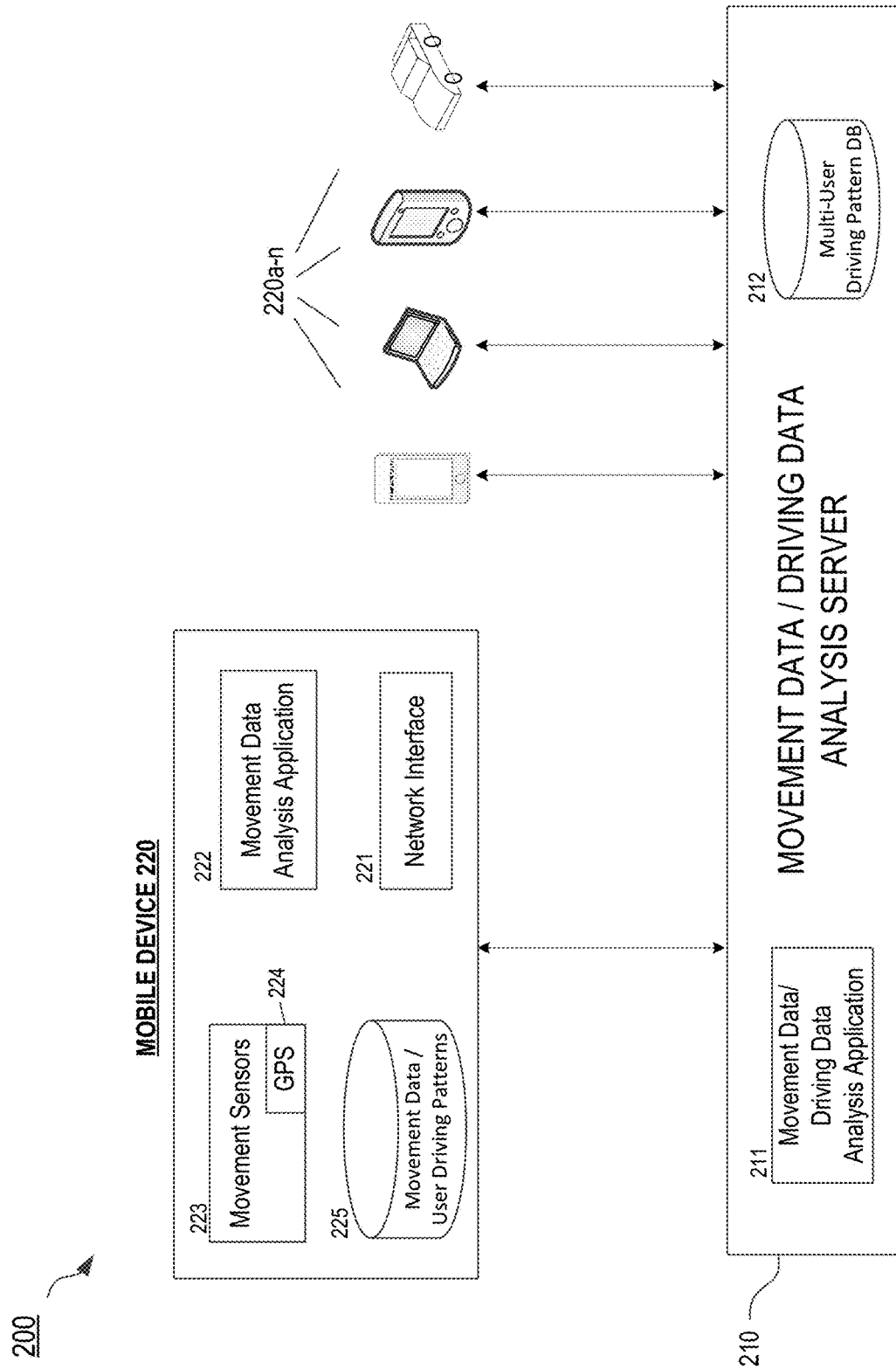
FIG. 2 is a diagram illustrating the components of an example movement data and driving data analysis system, according to one or more aspects of the disclosure.

FIG. 2 is a diagram of an illustrative movement data/driving data analysis system 200. In this example system diagram, a movement data/driving data analysis server 210 may communicate with a plurality of different mobile computing devices 220, which may include, for example, mobile user devices (e.g., smartphones, personal digital assistants, tablet and laptop computers, etc.), on-board vehicle systems, and any other mobile computing devices. Components 210 and 220 shown in FIG. 2 may be implemented in hardware, software, or a combination of the two, and each component of a movement data/driving data analysis system 200 may include a computing device (or system) having some or all of the structural components described above for computing device 101. Additionally, although not shown in FIG. 2, any movement data/driving data analysis system 200 described herein may include various non-vehicle roadway infrastructure devices, such as toll booths, rail road crossings, traffic cameras, and road-side traffic monitoring devices. In various examples, the movement data/driving data analysis servers 210 and/or mobile computing devices 220 may be configured to communicate with such infrastructure devices, which may serve as additional data sources for movement data and/or driving data. For instance, vehicle position, speed, acceleration, and the like, may be obtained by roadside traffic monitoring devices and transmitted to one or more mobile computing devices 220 and/or movement data/driving data analysis servers 210.

The data analysis server 210 may be, for example, a computer server having some or all of the structural components described above for computing device 101. As described below in more detail, in some cases the data analysis server 210 may be configured to provide movement data analysis software applications to various mobile computing devices 220. The data analysis server 210 also may be configured to receive and analyze movement data (which may or may not correspond to driving data) from mobile computing devices 220, attempt to identify driving patterns based on the received movement data, and use driving patterns to identify drivers and other driving characteristics associated with the movement data. Therefore, in some embodiments, the server 210 may include one or more movement data and/or driving data analysis software applications 211, and one or more driving pattern databases 212. As described below in more detail, the server 210 may distribute a first software application 211 to mobile devices 220, for example, a movement data analysis application 211 (which may be stored as application 222 on the mobile device 220). The movement data analysis application 222 may operate on the mobile device 220 to analyze movement data and determine driving patterns within the movement data. A second software application 211 operating on the server 210, may be configured to receive and analyze the driving pattern data from the movement data analysis application 222 on the mobile device 220, and to identify a driver for the driving trip by determining and matching an observed driving pattern to previously-stored driving pattern in the driving pattern database 212.

In order to perform the functionality described above, and the additional functionality discussed in more detail below, the server 210 may include one or more processing units (e.g., single-core, dual-core, or quad-core processors, etc.) having a minimum sufficient bit size (e.g., 32-bit, 64-bit, 96-bit, 128-bit, etc.) and minimum required processor speeds (e.g., 500 MHz, 1 GHz, etc.), and sufficient volatile and nonvolatile memory (e.g., at least 256 MB of RAM, at least 5 GB of memory, etc.), in order to store movement data/driving data analysis applications (e.g., including various different versions, upgrades, etc.), establish communication sessions with and distribute applications to various mobile computing devices 220, and receive and analyze movement data/driving data from the mobile computing devices 220. Additionally, as described below, private and secure data may be transmitted between the data analysis server 210 and various mobile computing devices 220, such as private location data, movement data, driving behavior data, and personal driver/customer data, etc. Therefore, in some embodiments, server 210 may include various security and/or integration components (e.g., web servers, authentication servers) and/or various network components (e.g., firewalls, routers, gateways, load balancers, etc.). The server 210 also may provide and/or require communications over certain secure protocols or encryption techniques (e.g., FTP or SFTP, PGP, HTTP or HTTPS, SOAP, XML encryption, etc.), in order to protect the private or secure data transmitted between the server 210 and various mobile computing devices 220.

The movement data/driving data analysis system 200 in these examples may also include a plurality of mobile computing devices 220. As discussed below, in some embodiments, mobile computing devices 220 may receive and execute a movement data analysis software application 222 from the server 210 or other application provider (e.g., an application store or third-party application provider). As part of the execution of the movement data analysis software application 222, or implemented as separate functionality, mobile computing device 220 may receive and analyze movement data from movement sensors 223 of the mobile device 220, identify driving patterns based on the received movement data, and use driving patterns to identify drivers associated with the movement data. Accordingly, in some embodiments, a mobile computing device 220 may include one or more processing units having a minimum sufficient bit size (e.g., 32-bit, 64-bit, etc.) and minimum required processor speeds (e.g., 233 MHz, 500 MHz, etc.), and sufficient volatile and nonvolatile memory (e.g., at least 256 MB of RAM, at least 1 GB of memory, etc.), in order to store and execute one or more such movement data analysis software applications, and to establish communication sessions with a data analysis server 210 and/or various other devices (e.g., on-board vehicle systems, other mobile devices 220, etc.) to transmit or receive movement data, driving pattern data, etc. Additionally, mobile computing devices 220 may receive and transmit private or secure data, such as private location data, movement data, and driving behavior data, and personal driver/customer data, etc. Therefore, in some embodiments, mobile computing devices 220 may include various network components (e.g., firewalls, routers, gateways, load balancers, etc.), and may provide and/or require communications over certain secure protocols or encryption techniques (e.g., FTP or SFTP, PGP, HTTP or HTTPS, SOAP, XML encryption, etc.), in order to protect the private or secure data transmitted between the mobile device 220 and other devices.

Mobile device 220, which may be a smartphone, personal digital assistant, tablet computer, on-board vehicle system, etc., may include some or all of the elements described above with respect to the computing device 101. In this example, mobile device 220 includes a network interface component 221, which may include various network interface hardware (e.g., LAN interfaces, WAN modems, or wireless transceivers, etc.) and software components to enable mobile device 220 to communicate with one or more movement data/driving data analysis servers 210, other mobile devices 220, and various other external computing devices (e.g., application stores, third-party driving data servers, etc.). As shown in FIG. 2, a movement data analysis software application 222 may be stored in the memory of the mobile device 220. The movement data analysis software application 222 may be received via network interface 221 from server 210 or other application provider (e.g., an application store). In different examples, movement data analysis software application 222 may or may not include various user interface screens, and may be configured to run as a user-initiated application or as a background application. For instance, as discussed below, there may be an initial training period during which a user of the mobile device 220 interacts with user interface screens of the movement data analysis software application 222 to establish predetermined driving patterns based on training data. In such cases, the movement data analysis software application 222 may be a user-initiated application during the training period, but may (optionally) switch to execute as a background application after the training period over. When the movement data analysis software application 222 executes as a background application, it may be automatically initiated by the mobile device 220 (e.g., by the operation system), and may be configured continuously or periodically collect movement data, identify driving patterns, and perform pattern matching and other functions described herein. When operating as a background application 222, these functions may be performed automatically, without any specific user input to launch the movement data analysis software application 222 or perform the functionality of the application described herein.

Mobile computing devices 220 may include one or more movement sensors 223 configured to detect, generate, and collect movement data when the device 220 is moved. Movement sensors 223 may include, for example, accelerometers, speedometers, compasses, gyroscopes, and/or global positioning system (GPS) receivers 224. Additional movement sensors 223 may include certain sensors that might not be specifically designed to detect movement, but nonetheless may be used to detect movement by collecting and analyzing the sensor data over time, for example, cameras, proximity sensors, and various wireless network interfaces capable of detect access to different data networks, mobile networks, and other mobile devices (e.g., via Bluetooth). Different mobile devices 220 may include different sets of movement sensors 223. For instance, one smartphone may include only an accelerometer and a clock to collect and store device acceleration data and corresponding time data, while another smartphone or vehicle on-board computer may include an accelerometer, clock, speedometer, and compass (to collect speed and directional data), etc. GPS receivers 224 optionally may be integrated into any of the mobile devices 220 described herein.

The memory of the mobile device 220 also may include one or more databases or other storage arrangements 225. Databases 225 may be configured to receive and store, for example, movement data collected by the movement sensors 223 of the mobile device 220, before that data is analyzed using the movement data analysis software application 222. In some cases, database 225 also may store the driving pattern data for one or more users of the mobile device 200. Driving pattern data, discussed in more detail below, may include one or more sets of movement data samples or calculations that may be used to identify a particular driver associated with observed driving data. Database 225 may store driving pattern data for the device owner and/or other devices users (e.g., family members, friends, and/or frequent users of the device 200). In some cases, multiple driving patterns may be stored for the same user. For instance, a driver may have different observable driving patterns when driving different cars (e.g., the family minivan versus the convertible), driving with different people (e.g., driving alone versus driving with family members), driving at different times/locations (e.g., driving to work versus on the weekend), driving during different seasons/conditions (e.g., summer versus winter driving), or driving in a caravan (e.g., leading or following other known drivers). In some examples, the driving data database 225 may exist within the application memory for the movement data analysis software application 222, and in other examples may be stored separately as persistent data within the device memory.

As shown in FIG. 2, in certain examples, a mobile device 220 may be an on-board vehicle system. In these examples, the on-board vehicle system 220 may correspond to a telematics device, vehicle computer, and/or on-board diagnostics systems. The on-board vehicle system 220 may include some or all of the elements described above with respect to the computing device 101, and may include similar (or the same) components to those in other mobile user devices 220 (e.g., smartphones, tablet computers, etc.). For on-board vehicle systems 220, movement sensors 223 may further include the various vehicle sensors, including hardware and/or software components configured to receive vehicle driving data collected by the various vehicle sensors. For example, vehicle sensors may detect and store data corresponding to the vehicle's speed, distances driven, rates of acceleration or braking, and specific instances of sudden acceleration, braking, and swerving. Sensors also may detect and store data received from the vehicle's internal systems, such as headlight usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems. Additional vehicle sensors may detect and store data relating to the maintenance of the vehicle, such as the engine status, oil level, engine coolant temperature, odometer reading, the level of fuel in the fuel tank, the level of charge in the battery (e.g., for hybrid or electric cars), engine revolutions per minute (RPMs), and/or tire pressure. Certain vehicles also may include cameras and/or proximity sensors capable of recording conditions inside or outside of the vehicle, as well as sensors configured to collect data associated with a driver's movements or the condition of a driver, for example, sensors that monitor a driver's movements, such as the driver's eye position and/or head position, etc. Additional safety or guidance-assistance features may be included in some vehicles, detecting and storing data such as lane departures, activation of adaptive cruise control, blind spot alerts, etc.

In still other examples, the mobile device 200 may be a user device as described above (e.g., a smartphone, personal digital assistant, or tablet computer, etc.), and also may include a vehicle interface component to allow the mobile device to establish communication with an on-board vehicle system. For example, either the mobile device 220 or a vehicle may be implemented with hardware (e.g., an input port or docking station) and/or software (e.g., network interfaces, secure protocols and encryption, etc.), and may be designed and configured to establish communication (using a wired or wireless connection) between the mobile device 220 and an on-board vehicle system. For example, a smartphone or tablet computer 220, which is often carried by a user, may include an on-board vehicle system interface to detect and/or connect to an on-board vehicle system whenever the user is driving (and/or riding as a passenger) in a vehicle. After a mobile device 220 establishes communication with an on-board vehicle system, which may be a telematics device, on-board diagnostic system, vehicle navigation device, or other vehicle computer system, the mobile device 220 may receive vehicle sensor data collected by various vehicle sensors, including a vehicle-based GPS receiver, or any other vehicle sensors. Thus, non-vehicle based mobile devices 220 (e.g., smartphones or tablet computers) may use vehicle interfaces to receive some or all of the same vehicle sensor data and driving data that is accessible to on-board vehicle systems 220, discussed above.

The movement data collected by the movement sensors 223 of the mobile device 220, or received from another the mobile device 220, may be stored in the memory of the mobile device 220 and/or transmitted to the server 210. As described below in reference to FIG. 3, this movement data may be analyzed by the mobile device 220 and/or by server 210 (e.g., using a movement data analysis software application) to determine when the movement data corresponds to a driving pattern, and using driving patterns to determine a driver and other characteristics of a driving trip. Although the examples described below in reference to FIG. 3 primarily refer to certain types of movement data, such as acceleration data, speed data, and time data, it should be understood that the movement data analyzed may include additional types of data such as rotation data, direction data, location data (e.g., GPS data), and any other movement data that may be determined from by the sensors 223 of a mobile device 220.

Figure 3:
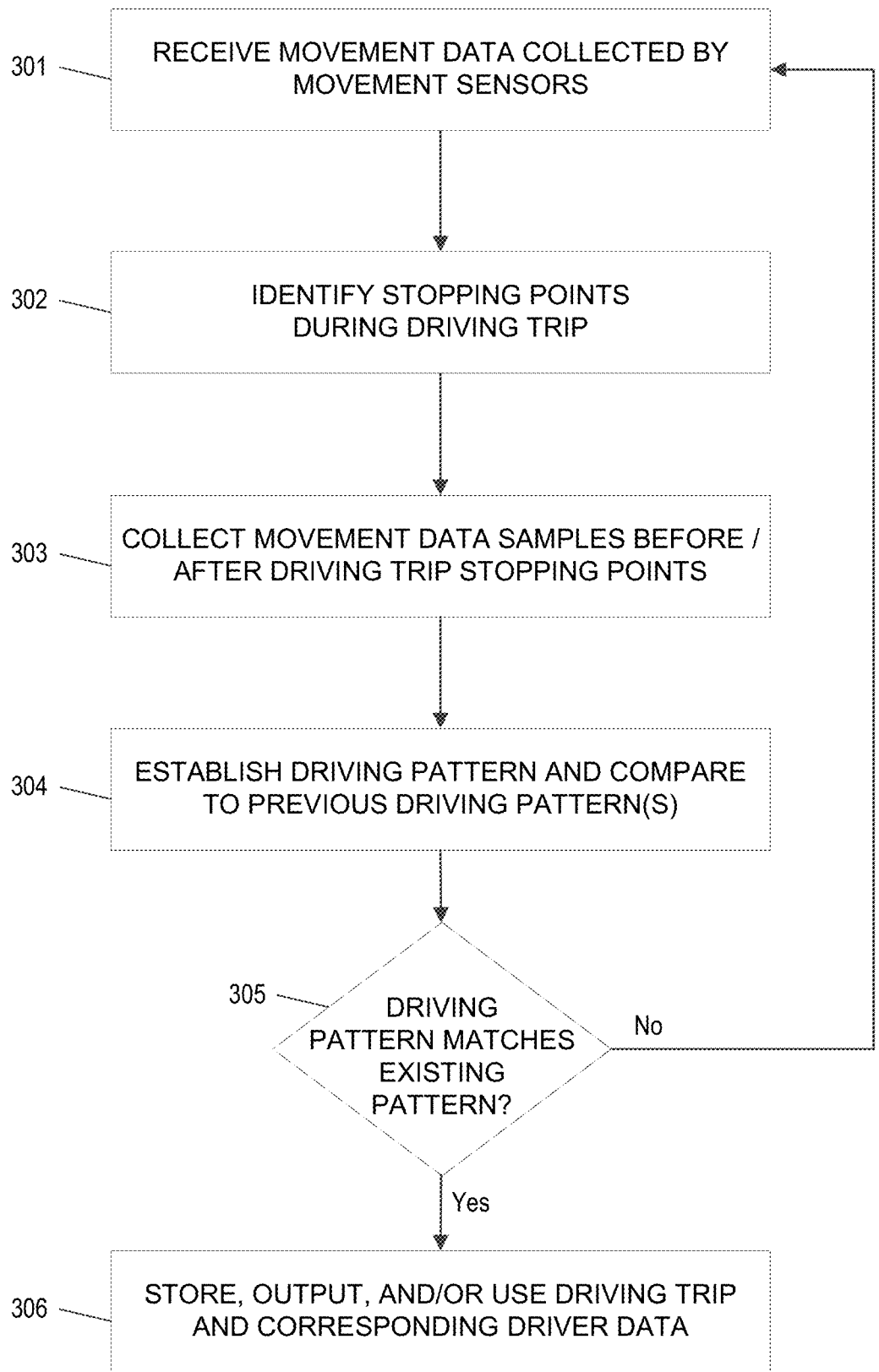
FIG. 3 is a flow diagram illustrating an example process of determining a driving pattern based on movement data, and comparing the driving pattern to one or more previously stored driving patterns, according to one or more aspects of the disclosure.

Referring to FIG. 3, a flow diagram is shown illustrating a process of receiving movement data collected by the movement sensors of a mobile device 220, and analyzing the movement data to identify driving patterns and associated drivers. The steps and various functionality described in reference to FIG. 3 may be performed by a mobile device 220, a movement data/driving data analysis server 210, or a combination of one or more mobile devices 220 and/or servers 210.

In step 301, a set of movement data is received at a computing device, for example, a mobile device 220 or a movement data/driving data analysis server 210. The movement data may correspond to the data collected by movement sensors 223 of a mobile device 220, such as acceleration, speed, location, and time data, along with any other movement data discussed above in reference to FIG. 2. For embodiments in which a movement data analysis is performed on a mobile device 220, step 301 may include the mobile device 220 receiving and locally storing the movement data from its various movement sensors 223. For embodiments in which a movement data analysis is performed on a separate server 210, step 301 may include one or mobile devices 220 collecting, formatting, and transmitting movement data to the server 210, which may receive and store the movement data from the mobile device(s) 220.

As noted above, the movement data received in step 301 may include acceleration data collected by an accelerometer of a smartphone, tablet computer, or the like. In some cases, the spatial position of the accelerometer with respect to a vehicle may be known, for example, if the user device containing the accelerometer is mounted, cradled, or otherwise positioned in a known alignment with the vehicle). In such cases, step 301 may include collecting axial acceleration data (e.g., x-axis, y-axis, and z-axis acceleration data), and using the axial acceleration data as described below. However, in other cases, the spatial position of the accelerometer with respect to a vehicle is not known, for example, if the user device with the accelerometer is sitting in the user's pocket or a bag, etc. In these cases, then step 301 may include calculating the norm (or length) of the acceleration vector, determined by the following equation:

$$\|a\|=(a_x^2+a_y^2+a_z^2)^{1/2}$$

In step 302, the movement data received in step 301 may be analyzed and a number of stopping points may be identified during a driving trip. In some cases, a stopping point during a driving trip may correspond to a stop sign, stoplight, or other intersection stopping point, yielding or merging in traffic, stop-and-go traffic conditions, etc. Additionally, parking a vehicle for an extended period of time during a driving trip, or at the end of a driving trip, may be a stopping point identified in step 302. As discussed below in steps 303 and 304, driving patterns may be based on speed data, acceleration or braking data, or other movement data during time windows before and after various stopping points during a driving trip. Specifically, steps 303 and 304 below describe creating predetermined driving patterns based on training data, by analyzing movement data near stopping points, and then comparing the predetermined driving patterns to driving patterns determined using observed driving data during a driving trip. Thus, in these examples, the driving trip data analysis in steps 303 and 304 may rely on the initial identification/determination of one or more stopping points during a driving trip in step 302.

In step 302, in order to detect a stopping point during a driving trip, a movement data analysis software component (e.g., an application) may be executed to analyze input movement data, such as accelerometer and/or speed data, and may output data corresponding to one or more instances of a stopping point during a driving trip. For instance, a movement data analysis software application may conclude that a stopping point has occurred when a speedometer in a mobile device 220 (e.g., smart phone, tablet computer, or vehicle on-board computer, etc.) indicates a speed of zero, or near zero within a predetermined threshold (e.g., less than 0.5 miles-per-hour, less than 1 mile-per-hour, etc.). In other examples, a movement data analysis software application may conclude that a stopping point has occurred when an accelerometer in a mobile device 220 indicates an acceleration equal to zero for a predetermined minimum time threshold (e.g., 0.5 seconds, 1 second, 2 seconds, etc.). Although an acceleration sensor reading of zero does not necessarily indicate a velocity of zero, this will commonly be the case during any real-world driving trip, especially when acceleration is measured at zero over a period of time (e.g., 0.5 seconds, 1 second, 2 seconds, etc.), and thus the analysis in step 302 may include acceleration data without speed data in some cases. In still other examples, a combination of speed data and acceleration data may be used to identify stopping points during a driving trip (e.g., time t at which acceleration (a)=0 and velocity (v)=0).

Thus, in some cases, stopping points during a driving trip may be determined based only on speed and/or acceleration data. However, in other examples, stopping points may be determined based on additional data such as location data (e.g., GPS data), rotation rate data, vehicle operation and control data (e.g., received from vehicle sensors), and other data relevant to determining a stopping point during a driving trip. For example, GPS data may be used to match the location of the a vehicle at a certain time to known locations of stopping points along driving routes, such as stop signs, stop lights, yielding and merging points, and other known stopping points along driving routes. In still other examples, cameras or proximity sensors of a mobile device 220 may be used to identify and/or classify stopping points (e.g., by detecting stop signs, stop lights, or determining a movement stop based on the image or proximity data).

Additionally, in some examples, GPS location data, traffic data, driving route data, weather data, and/or additional types of data may be used to select specific stopping points during a driving trip. For instance, certain stopping points during a driving trip, and the braking and acceleration that occur before and after the stopping points, may be affected by external factors such as traffic, weather, time of day, season, or other external factors. In some cases, stopping points that are sensitive to such external factors (e.g., stop-and-go traffic, sudden braking caused by pedestrian or bicyclist, etc.) may be excluded from the analysis in steps 303-304, and only those stopping points may be used which are deemed less dependent on external factors and more so on the driver's acceleration and braking behaviors. For instance, certain specific time and space localities may be selected, such as neighborhood stop signs or stoplights on less crowded roads, which are deemed not to have relevant traffic or weather considerations for the evaluation of acceleration and braking patterns.

After identifying one or more stopping points during a driving trip in step 302, movement data/driving data may be collected at predetermined points before and after each identified stopping point in step 303. In some cases, speed, acceleration, and/or location data values may be collected at specific time intervals before and after each stopping point, for instance, 0.5 seconds before and after each stopping point, 1 second before and after each stopping point, 2 seconds before and after each stopping point, ..., 5 seconds before and after each stopping point, ..., 10 seconds before and after each stopping point, ..., and so on. Additionally, different time intervals (and thus different lengths of time windows) of data may be collected depending on the type of a stopping point. For example, if a stopping point is determined to be a stop sign in a residential area with a relatively low speed limit, then small time windows of data (e.g., 3 seconds) before and after the stopping point may be sufficient to capture the relevant movement data near the stopping point. However, if a stopping point is identified as a stop sign or stop light on a road with a faster speed limit, then larger time windows of data (e.g., 7 seconds) may be collected in step 303. As another example, if a stopping point corresponds to an initial departure of a vehicle at the beginning of a driving trip, or parking a vehicle at the end of a driving trip, then even larger time windows of data (e.g., 30 seconds) may be collected in some cases, for instance, in order to capture the movement data corresponding to parallel parking, driveway maneuvering, or parking lot or garage maneuvering before and/or after the vehicle is parked.

In still other examples, data from additional data sources may be used to determine the length of time windows and/or specific relevant points during the time windows. For example, vehicle cameras, non-vehicle based traffic cameras, road-side traffic monitoring devices, and/or other roadway infrastructure may be used to determine a time at which a stop light changed from green to yellow, or from red to green, in order to measure driver reaction time and/or movement patterns (e.g., acceleration/braking, speed, etc.) in relation to the light changing color. As discussed above, either a mobile device 220 or a movement data/driving data analysis server 210 may establish communication with a roadway infrastructure device to access the data collected by the device.

For any of the above examples, $U_-(t)$ and $U_+(t)$ may represent points in time before and after a stopping point, and $F^*_-(u)$ and $F^*_+(u)$ may represent a set of empirically determined (i.e., sample based) movement or location values using an empirical cumulative probability distribution function (ECPDF). The values obtained using the ECPDF may, for example, correspond to acceleration values, speed values, or location values (respective to the location of the stopping point) that were recorded during time intervals $U_-$ and $U_+$ before and after a stopping point.

In other examples, data may be collected before and after stopping points based on speed intervals, rather than time intervals. For instance, $U_-$ and $U_+$ may be defined in independent terms, such that $U_-$ (40, 20) may correspond to the points before the stopping point at which the vehicle was traveling 40 MPH and then 20 MPH, and $U_+$ (20, 40) may correspond to the points after the stopping point at which the vehicle was traveling 20 MPH and then 40 MPH. In such examples, the relevant time intervals may be solved for using the equation:

$$\int_{t0}^{t} a(x)dx = V$$

In the example above, v=20, 40. In this example, let $T_v$ be the solution of the above equation so that $v(t_{40})=40$, and $t_{40}$ will be the time it takes the driver to reach 40 MPH after the stopping point. Similar techniques may be used to determine how long it takes the driver to reach 20 MPH after the stopping point, how long it takes the driver to brake from 40 MPH to reach a complete stop at the stopping point, and so on.

In still other examples, data may be collected before and after stopping points based on distance intervals from the stopping point, rather than speed or time intervals. For instance, $U_-$ (200, 100) and $U_+$ (100, 200) may be defined in terms of the vehicle speed or time when the vehicle is 100 feet and 200 feet before and after the stopping point.

In step 304, one or more driving patterns may be determined based on the driving data collected in step 303, and the determined driving patterns may be compared to previously determined driving patterns. The techniques discussed below, used for creating and storing driving patterns based on the driving data collected in step 303, may be similar or identical to the techniques used to create the previously determined driving patterns based on previous driving data (e.g., training data). Thus, $F_-(u)$ and $F_+(u)$ may represent the ECPDF resulting from a set of training data (e.g., training sessions with drivers using the system) or a set of recent observed driving data collected in step 303. Additionally, the training data and/or observed driving data, and the resulting ECPDFs, may be both driver-specific and vehicle-specific. For instance, for a first driver and first vehicle, the resulting $F_-(u)$ and $F_+(u)$ may indicate a 0-60 MPH of 7.7 seconds, and a quarter mile time of 15.6 seconds. Such values may provide a reasonable estimate for the length $|U_+|$ of the first driver's acceleration interval when driving the first vehicle. These functions may be similarly used to determine $|U_-|$, for example, the braking interval from 60 MPH to a full stop of the first driver when using the first vehicle.

In order to establish the $F_-(u)$ and $F_+(u)$ for a single driver-vehicle combination, either when creating driving patterns based on training data or when determining driving patterns in real-time or near real-time for a current driving trip based on the observed driving data, movement and/or location data may be collected from a number of different stopping points. It may be desirable to collect and analyze driving data for multiple different stopping points and/or across multiple different driving trips, because no two stopping points will have identical driving data records. Thus, a driving data record (e.g., acceleration data, speed data, and/or location data before and after stopping points) may be seen as a trajectory in a certain functional space, $\Im$, and variability of the driving records for a driver-vehicle combination may be described in terms of a probability distribution on $\Im$. The driving data records of a driver-vehicle combination, and/or the resulting probability distribution on $\Im$, may be referred to as a driving pattern in certain examples. By analyzing the driving data records corresponding to driving data before and after stopping points, it can be seen that different drivers may impose different probability distributions on $\Im$, and thus have different driving patterns. Therefore, different driving patterns, which may be represented by sets of driving data records (e.g., acceleration data records, speed data records, location data records, etc.), empirical cumulative probability distribution functions (ECPDFs) such as $F_-(u)$ and $F_+(u)$, different probability distributions on $\Im$, or other driving pattern data, may be determined and stored for each different driver. Additionally, the same driver driving two different vehicles, or driving under different conditions (e.g., different passenger configurations, different times/locations, different seasons or weather conditions, etc.) also may have different driving data records and may impose different probability distributions on $\Im$. Therefore, multiple different driving patterns may be determined and stored for the same driver, for example, for different driver-vehicle combinations, or for different driver-vehicle combinations with additional driving variables or conditions such as passengers, weather, time, location, season, etc.

As discussed above, the process in step 304 of determining a driving pattern based on observed driving data (e.g., speed, location, and/or acceleration data) may be similar or identical to the process of determining various driving patterns based on training data, which may occur in advance prior to the steps of FIG. 3. During the training process, drivers may interact with a user interface of a movement data analysis application 222, after the application is installed on their mobile device 220 or their vehicle. Drivers may identify themselves, their vehicles, and/or other driving factors (e.g., current weather, road conditions, routes driven, etc.) at the beginning and/or ends of driving trips during an initial training period. During the training period, the movement data analysis application 222 may determine stopping points during driving trips (similar to step 302), collect driving data before and after stopping points (similar to step 303), and establish driving patterns based on the driving data (similar to step 304). Training periods may last a predetermined amount of time (e.g., a numbers of days or weeks), a predetermined amount of driving time (e.g., a number of driving hours), or a predetermined number of driving trips. During the training period, and even after a training period ends, the movement data analysis application 222 may periodically or continuously update a driver's established driving pattern(s). As more driving data becomes available for a particular driver, it may be possible to update that driver's driving patterns to make the patterns reflect the driver's driving behaviors near stopping points with greater accuracy. Additionally, as discussed above, a driving pattern may correspond to a driver, a combination of a vehicle and driver, or a combination of a vehicle, driver, and/or other driving factors (e.g., day versus night driving, weather, time of day, etc.) Thus, multiple different driving patterns may be established for a single driver during a training period. Additionally, when a vehicle or mobile device 220 is shared by multiple users, multiple different driving patterns may be established for the different users.

Driving patterns established during training periods (and updates to driving patterns after training periods) may be stored locally on the mobile device 220 (e.g., in database 225) and/or may be transmitted to and stored on a movement data/driving data analysis server 210 (e.g., in database 212).

Returning to step 304, a driving pattern determined based on the current driving data collected in step 303 (i.e., driving data before and after one or more stopping points during a driving trip) may be compared to one or more driving patterns previously determined based on training data and/or stored in databases (e.g., 212 and 225). The driving pattern comparisons in step 304 may be used to identify a driver, a driver-vehicle combination, and/or additional driving variables or conditions (e.g., weather, time of day, driving route, etc.), by matching the observed (i.e., current) driving pattern to one or more predetermined driving patterns.

In step 304, an observed driving pattern, which may take the form of sample sets of driving data points (e.g., speed data points, acceleration/braking data points, distance/location data points), empirical cumulative probability distribution functions (ECPDFs) such as $F_-(u)$ and $F_+(u)$, and/or probability distributions on $\Im$, may be compared to the previously determined driving patterns corresponding to drivers, driver-vehicle combinations, and/or additional variables or conditions. In certain examples, verifying the identity of a current driver Z may be performed using hypothesis testing techniques. For instance, for a finite set A of observed trajectories (e.g., speed, acceleration, or distance records in a certain functional space $\Im$):

$$A=\{a_i(t)\in\Im,(i=1,\ldots,L)\}:$$

The hypothesis testing in this example may be expressed as follows: True or False, the elements of A are sampled from the probability distribution $P_z$ on $\Im$ associated with driver Z. The null hypothesis in this case may be that the observed and stored trajectories are sampled from the same distribution. However, as noted above, more than one driving pattern or set of profiles $F_-(u)$ and $F_+(u)$ may be stored for a single driver, for example, corresponding to different driver-vehicle combinations and/or other driving factors such as weather, traffic, passengers in vehicle, time and locations of driving, etc. Thus, multiple hypotheses may be tested for each observed driving pattern. For simplicity, a single trajectory, L=1, may be used in certain examples, while multiple trajectories L=1, L=2, ..., may be used in other examples.

In order to test the above hypothesis, and thus to match an observed driving pattern to a previously stored driving pattern, various different examples and types of algorithms may be used. For instance, a Kolmogorov-Smirnov (KS) nonparametric test may be used in certain examples. KS tests and other similar algorithms may be generally used to compare two samples (e.g., driving patterns in this case), and comparisons within a KS may detect differences in both the location and/or shape of the ECDFs (e.g., driving pattern functions in this case) of the two samples. KS tests may be one or two sample tests, depending on the application. For example, verifying that an observed driving pattern corresponds to a previously stored, well-established driving pattern may require only a one sample test, whereas testing a hypothesis that a driver from a first observed driving trip is the same as the driving from a second observed driving trip may involve a two-sample KS.

In certain examples, a KS test performed in step 304 may be based on a value $D_{n,m}$ of the normalized KS statistics, $\sup|F_n(u)-G_m(u)|$, as shown in the following equation:

$$D_{n,m} = \left(\frac{nm}{n+m}\right)^{1/2} \sup_u |F_n(u) - G_m(u)|$$

In this example equation, $F_n(u)$ and $G_m(u)$ may correspond to empirical CPDFs of two samples of sizes n and m, respectively. In this example, under the null hypothesis, if the samples are drawn from the same continuous distribution $(F_n(u)\sim G_m(u))$, then the CPDF of $D_{n,m}$ may converge to Kolmogorov's distribution K(x), as given by the equation:

$$K(x)=1-2\Sigma(-1)^{k-1}e^{-2(kx)^2}$$

K(x) in this example may be calculated and corresponding values may be readily available. Assuming a sufficiently large number of driving data samples, an $x_\alpha$ may be chosen such that $P(D_{n,m} > x_\alpha) = \alpha$, wherein $\alpha$ is small number (e.g., 0.05) by solving for the equation $1 - K(x_\alpha) = \alpha$.

Using the above calculations, a standard decision making algorithm may be executed in step 304 to determine if the driver for the observed driving data is the same as the driver associated with a previously-stored driving pattern. In such an algorithm, the driving data (e.g., deceleration and acceleration values d[1:n], a[1:n], or corresponding speed data, location data, etc.) may be received as input, corresponding to the observed (i.e., current) driving trip. Then, $\alpha$, $x_\alpha$, described above, also may be received as input. Using these inputs, the values of $F_n(u)$ and $G_m(u)$ may be calculated as described above, and $D_{n,m}$ may be calculated using the KS test above. In this example, if $D_{n,m} > x_\alpha$, then the null hypotheses may be rejected and the analysis in step 304 may conclude that the current driving pattern does not match the previous driving pattern. Otherwise, if $D_{n,m} \leq x_\alpha$, then the null hypotheses may be accepted and the analysis in step 304 may conclude that the current driving pattern matches the previous driving pattern.

In the above example, the probability of a false negative determination (i.e., a determination that the observed driving pattern does not match the previously stored driving pattern, when the driving patterns do in fact match) is equal to a (e.g., 0.05). On the other hand, the probability of a false positive (i.e., a determination that the observed driving pattern matches the previously stored driving pattern, when the driving patterns do not in fact match) may require additional calculation using volumes of data on values of $D_{n,m}$. For instance, the false positive probability may be approximated using the corresponding CPDF based on sampling data.

For examples in which acceleration data is used to determine driving patterns, the calculations above may be applicable when three-axis acceleration data is available. In other cases, if three-axis acceleration data is not available, alternative data may be used in the statistical analysis, corresponding to the norm (or length) of the acceleration vector, which may be computed by the following equation:

$$\|a\| = (a_x^2 + a_y^2 + a_z^2)^{1/2}$$

In these examples, the data may be collected over time intervals, such as $U_- = (40, 20)$ and $U_+ (20, 40)$, and may be used to determine the empirical cumulative probability distribution functions (ECPDFs) $F''_-(u)$ and $F''_+(u)$. Then, the distance $d(F, G)$ between two CDPFs, F and G, may be determined by the equation:

$$d(F, G) = \sup_u |F(u) - G(u)|$$

In additional examples, verification algorithms (e.g., using KS distribution as described above) may be applied to couples, such as $(F''_-(u), F_-(u))$ and $(F''_+(u), F_+(u))$, by computing normalized distances, as shown in the following equation:

$$n^{1/2} d(F''_-(u), F_-(u)) \text{ and } n^{1/2} d(F''_+(u), F_+(u))$$

In this example, $F_-(u)$ and $F_+(u)$ may be driving patterns in the form of CPDFs of acceleration profiles established for known drivers, for instance, during training sessions.

The proceeding paragraphs described a first set of algorithms implementing a Kolmogorov-Smirnov (KS) nonparametric test for comparing an observed driving pattern to a previously stored driving pattern. However, in other examples, alternative sets of algorithms may be used. For instance, as described below, a second set of algorithms may be used taking into consideration the dependency between driving data values (e.g., speed values, acceleration values, distance or location values, etc.) at consecutive moments in time.

According to a second set of algorithms that may be used to compare an observed driving pattern to a previously stored driving pattern, the determinations in steps 304 may begin by selecting a set of time moments $t_i$ (i=1, k) inside $U_-(U_+)$. In various cases, the time moments may or may not be chosen uniformly, for example, depending on the volatility of the driving data values.

In these examples, frequencies (corresponding to sample-based probabilities) may be computed based on driving data at consecutive time intervals $t_i$ and $t_{i+1}$. These frequencies may be computed as follows for a set of intervals $A_i$, for all time moments $t_i$ and $t_{i+1}$:

$$P(a(t_{i+1}) \in A_{i+1} | a(t_i) \in A_i), A_i \subset R$$

In this example, assuming that a(t) is a Markov random process, the joint probability then may be computed using the following equation:

$$P(a(t_1) \in A_1, \ldots, a(t_k) \in A_k) = P(a(t_1) \in A_1) P(a(t_2) \in A_2) | a(t_1) \in A_1^*, \ldots, {}^* P(a(t_k) \in A_k) | a(t_{k-1}) \in A_{k-1}$$

Then, using a choice of intervals $A_i$, which may be driver specific (or driving pattern specific), we can restate the equation as follows:

$$P(a(t_1) \in A_1, \ldots, a(t_k) \in A_k) = 1 - \alpha$$

Based on this equation, the decision making in step 304 corresponds to the following determination. If $a(t_1) \in A_1, \ldots, a(t_k) \in A_k$, then the null hypothesis may be accepted and the analysis in step 304 may conclude that the current driving pattern matches the previous driving pattern. Otherwise, the null hypothesis may be rejected and the analysis in step 304 may conclude that the current driving pattern does not match the previous driving pattern. In this example, the probability of a false negative determination (i.e., a determination that the observed driving pattern does not match the previously stored driving pattern, when the driving patterns do in fact match) is equal to $\alpha$.

According to a third set of algorithms that may be used in steps 303 and 304, a mapping into multidimensional space may be performed in order to test the hypothesis that the observed driving data, represented by ECPDF $F''_-(u)$, matches the stored driving pattern $F_-(u)$. In this example, two vectors $\psi$ and $\phi$ are calculated using the following equations:

$$\psi = \{d(F''_-(u), G_i)\}_{i=1}^N$$

$$\phi = \{d(F_-(u), G_i)\}_{i=1}^N$$

Within the calculations for vectors $\psi$ and $\phi$, the $G_i$ correspond to selected CPDFs, which may or may belong to a database of existing driving patterns (e.g., a central database 212 including all driving patterns for driver-vehicle combinations). The components of the vectors $\psi$ and $\phi$ may be viewed as coordinates of $F''_-(u)$ and $F_-(u)$ with respect to a basis $G_i$. In these examples, there is an assumption that different ECPDFs will produce different $\psi$ and $\phi$ values, which will be significantly removed in terms of Euclidian distance.

If this assumption holds true, then the comparison in step 304 between the observed driving pattern and a previously stored driving pattern may be performed by evaluating if $\|\psi - \phi\| > H$. If this statement is true, then the null hypothesis may be accepted and the analysis in step 304 may conclude that the current driving pattern matches the previously stored driving pattern. Otherwise, the null hypothesis may be rejected and the analysis in step 304 may conclude that the current driving pattern does not match the previous driving pattern. H, in this example, may be constant value selected to control the false negative error probability. H may be selected using data from a training data set.

As noted above, step 304 may include multiple comparisons of the observed driving pattern (e.g., sample sets of driving data points, empirical cumulative probability distribution functions (ECPDFs), and/or probability distributions based on the driving data set from the driving trip identified in step 302) against multiple corresponding driving patterns which may represent a database of driving patterns for different drivers, driver-vehicle combinations, and/or other driving factors. Thus, a matching driving pattern in step 304 may correspond to a driver identity or a driver-vehicle combination, and may include determining a match to one or more additional driving conditions or factors such as weather, traffic, passengers in vehicle, time and locations of driving, etc.

In step 305, if one or more driving patterns are identified as matches corresponding to a driver, vehicle, and/or other driving factors (305:Yes), then the corresponding driver/vehicle/driving factor data, along with various other driving trip data may be stored or output via the server 210, mobile device 220, or other computing device in a movement data or driving data analysis system in step 306. Depending on which previously stored driving pattern(s) were matched in steps 304-305, step 306 may store/output a determined driver identity, vehicle identity, and/or other driving factors (e.g., weather, season, traffic, etc.). For example, a successful comparison in steps 304-305 between a current driving pattern and previously stored driving pattern may allow a movement data analysis application on a server 210 or a mobile device 220 to determine that the current driving trip is been driven by a specific driver, using a specific vehicle, and/or in certain weather, traffic, time, or other driving conditions.

Additional data may be stored/output in step 306 corresponding to other driving data characteristics not directly related to the driving pattern matching performed in steps 304-305. For example, one or more measurements of accident-free driving, safe driving, or unsafe driving may be determined for the driving trip, based on factors such as the detection of a vehicle impact, air bag deployment, skidding or swerving, average driving speed, use of seatbelts, turn signals and other vehicle controls, traffic and weather conditions, detections of tailgating, intoxication, moving violations, and other safe or unsafe driving behaviors. Additional driving data stored/output in step 306 may relate to the times and locations driven, choices of routes taken, radio stations listened to, and any other factors relating to driving behaviors or driver preferences.

The driving data stored/output in step 306, when associated with the corresponding driver and/or vehicle data determined in steps 304 and 305, may have many different applications and may be provided to many different entities. For example, after comparing and matching driving patterns in step 304 to determine a specific driver, then additional driving data from the driving trip may be collected and transmitted to various entities and used for various different purposes, such as vehicle or driver insurance or financing (e.g., driving data indicating safe or unsafe driving), law enforcement (e.g., driving data indicating moving violations), and product retail or marketing entities (e.g., driving data indicating a driver's driving behaviors and habits, such as radio stations and ads listened to, routes driven and stops made, etc.).

To illustrate, in certain examples the movement data/driving data analysis server 210 may correspond to an insurance company server. In such examples, the insurance company may operate a movement data analysis software application 211, and may distribute corresponding software applications 222 to customers or potential customers of the insurance company. Databases 212 and/or 225 may be used to store driving patterns of insurance company customers, for example, database 225 may store driving patterns only for those customers associated with mobile device 220 (e.g., driver-vehicle patterns for the customer/primary device owner, family members, friends, etc.), while database 212 may store a repository of driving patterns for all customer of the insurance company and/or other drivers of other insurance companies. In these examples, the data stored/output in step 306 may allow the insurance company server 210 to identify a customer (or potential customer) as a driver of a particular driving trip (e.g., even if a customer is not driving his/her own vehicle), and then use the corresponding driving data to detect accidents and determine safe or unsafe driving by the customer. Such determinations may allow the insurance company to adjust the customer's driver score, offer insurance rate discounts, suggest new insurance plans and products that may be advantageous based on the customer's driving habits, etc. Although this example relates to an insurance company, it should be understood that similar systems may be implemented by banks and financial institutions, law enforcement and governmental entities, and various retail entities, to offer targeted products, services, or incentives based on driving data.

As discussed above in reference to FIG. 3, the receipt and analysis of movement data, identification of driving patterns, and determination of associated drivers based on driving pattern matching, may be performed entirely by either a movement data/driving data analysis server 210 or by a mobile device 220 executing a movement data analysis software application 211 or 222. For example, driving pattern determination data and a repository of driving patterns may be transmitted to and/or stored by a mobile device 220, so that the mobile device can perform the driving pattern matching without needing to communicate with any external server. Alternatively, server 210 may be configured to receive and analyze movement data from various mobile devices 220, and entirely perform the driving pattern identification and pattern matching while only using the mobile devices 220 to collect the raw movement data. However, as discussed below in reference to FIG. 4, in other examples, a driving data analysis server 210 may work in combination with one or more mobile devices 220 to collect and analyze movement data, determine driving patterns, match driving patterns, and determine associated drivers and other driving data/factors.

Figure 4:
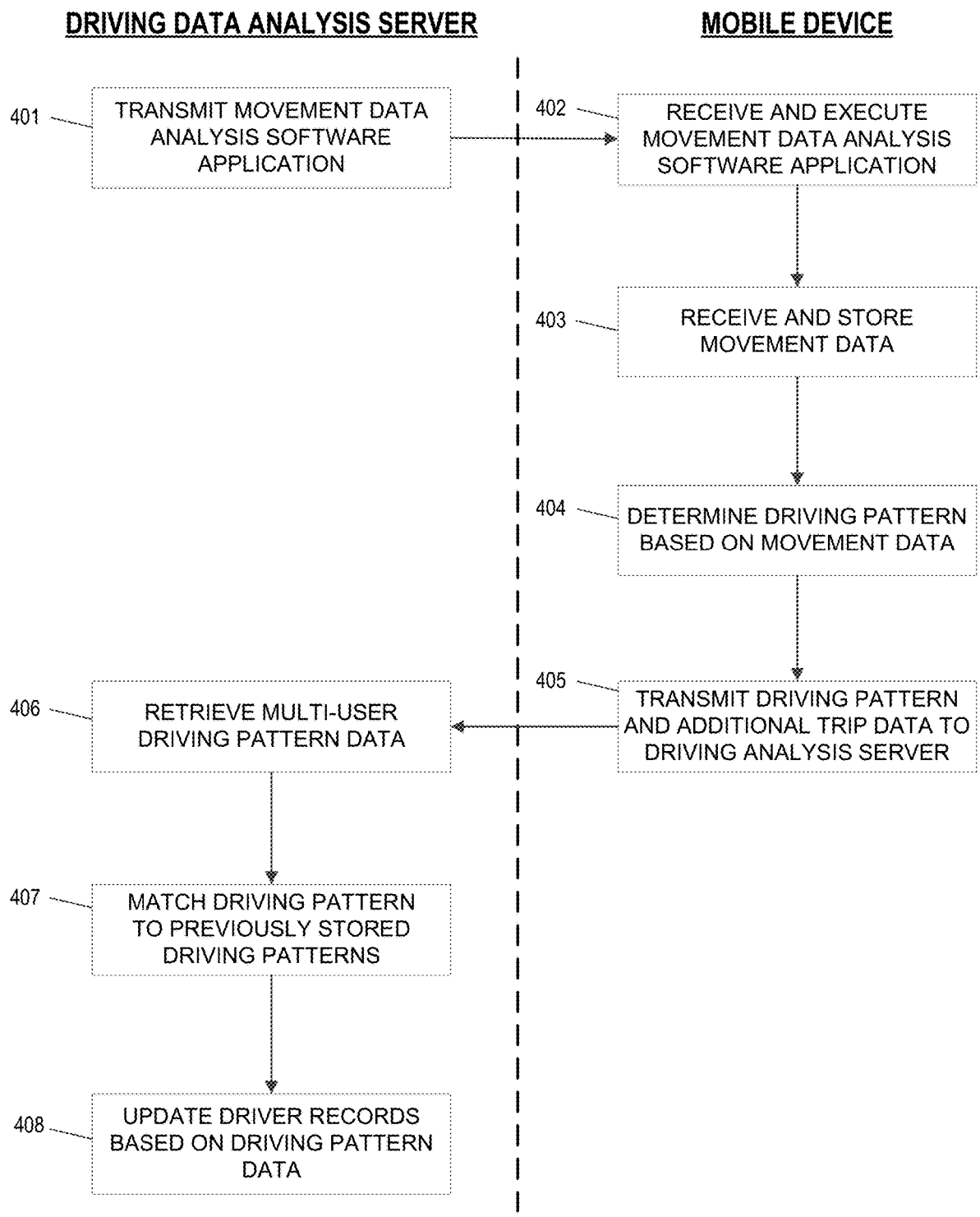
FIG. 4 is a flow diagram illustrating another example of collecting movement data at a mobile device, and using the movement data to determine a driving pattern and driver associated with a driving trip, according to one or more aspects of the disclosure.

Referring now to FIG. 4, another example is shown illustrating a process of analyzing movement data, identifying driving patterns, and determining associated drivers and other driving data. The process illustrated in FIG. 4 may be implemented in various different movement data/driving data analysis systems including, as in this example, one or more driving data analysis servers 210 and/or mobile devices 220.

In step 401, a movement data or driving data analysis server, such as server 210 described above, may transmit a movement data analysis software application 222 to one or more mobile devices 220 (e.g., smartphones, tablet computers, on-board vehicle systems). Step 401 may be optional in certain embodiments, and in some cases, a movement data analysis software application 222 need not be transmitted to the mobile device 220. Rather, the mobile device 220 may be configured to collect and transmit movement data without needing a specialized software application from a data analysis server 210. For instance, a mobile device 220 may use a third-party movement data collection application, a web-based interface, and/or may use predetermined formats and protocols for collecting and transmitting movement data, instead of using a movement data analysis software application 222 from a server.

In step 402, the mobile device 220 may receive and execute the movement data analysis software application 222, and in step 403, the movement data analysis software application 222 may control the mobile device to receive and store movement data. In some examples, step 403 may be similar or identical to steps 301-303, discussed above. For instance, the mobile device 220 may execute the received movement data analysis software application 222 and/or perform other techniques to collect movement data from any of the movement sensors 223 and other movement data sources discussed above (e.g., accelerometer, speedometer, gyroscope, GPS receiver 224, or via communication with on-board vehicle sensors, etc.). As discussed above in steps 301-303, an initial set of movement data may be received from one or more movement sensors 223 of a mobile device 220. The movement data may be analyzed to identify one or more stopping points, and the data before and after the stopping points may be collected and used to establish/determine driving patterns. The movement data received in step 403 may be stored in a secure memory on the mobile device 220, or may be stored off-device in a separate secure data repository.

In step 404, the mobile device 220 analyzes the movement data and determines driving patterns based on the movement data. In some examples, step 404 may be similar or identical to certain features of step 304, discussed above. For instance, one or more of the process steps discussed above may be used to analyze the movement data collected by the mobile device 220, and to determine one or more driving patterns based on the movement data. As discussed above, driving patterns determined in step 404 may take the form of sample sets of driving data points, such as speed data points, acceleration/braking data points, distance/location data points, etc., before and after stopping points. Driving patterns also may take the form of empirical cumulative probability distribution functions (ECPDFs), such as $F_-(u)$ and $F_+(u)$ discussed above, and/or probability distributions on $\mathfrak{F}$.

In step 405, after determining one or more driving patterns within the movement data in step 404, the mobile device 220 may transmit data corresponding to the driving patterns, and potentially additional driving data, to a driving analysis server 210. As discussed above, additional driving data collected and transmitted in step 405 may be further data used to determine driving patterns, or may be unrelated to the driving pattern matching processes. For instance, insurance companies, financial institutions, law enforcement entities, and other organizations may be interested in different types of driving data which may be used in various ways after driving pattern matching is used to identify a driver. Thus, different organizations may provide different versions of movement data analysis software applications to mobile devices 220 in order to collect the desired types of relevant movement and driving data (e.g., GPS data, safe or unsafe driving behavior data, vehicle control usage data, etc.).

In some cases, one or more mobile devices 220 (e.g., smartphones, tablet computers, on-board vehicle systems, etc.) each may transmit their driving pattern data to multiple different servers 210 (e.g., different insurance provider servers 210, governmental servers, business or other organizational servers 210, etc.) in step 405, so that multiple different organizations may use their various computing systems to separately analyze the driving pattern data and additional driving data, and perform custom pattern matching and relevant driving determinations. When transmitting/receiving the driving pattern data and/or additional driving data, mobile devices 220 and servers 210 may use, for example, secure data transmission protocols and/or encryption, such as FTP, SFTP, and/or PGP encryption. In some examples, a secure web service may be provided by a server 210 (e.g., an insurance provider server 210), using SSL, TLS, HTTP, and/or HTTPS.

Along with the driving pattern data transmitted in step 405, the additional driving data transmitted may correspond to driving data collected by the various sensors 223. For example, acceleration/braking data, speed data, vehicle location data and times, vehicle operational data (e.g., braking, steering, RPMs, etc.), driving behavior data (e.g., turn signal, seat belt and radio usage, driver distraction data, etc.), and any other driving data discussed above may be transmitted with the driving pattern data in step 405. In other cases, the mobile device 220 may be configured to analyze the raw driving data, and then generate and transmit only summary data, for example, averages of miles driven per day/week/month/etc., average driving speeds, average driving acceleration, braking, and steering patterns, average driving times, turn signal and seat belt usage patterns, average driving road and weather conditions, and the like, to a driving data analysis server 210. Additional driving data and driving behaviors may be detected, stored, and transmitted, including, for example, adaptive cruise control activation, electronic stability control, lane departure activation, blind spot detector activation, and other features implemented by various car manufacturers relating to the handling of a vehicle and/or providing feedback to the driver while driving.

Additionally, the mobile device 220 may transmit driving data to the server 210 while continuing to collect and analyze additional movement data. In some cases, the mobile device 220 may continuously collect and analyze movement data and periodically transmit driving data each time a new driving pattern is identified based on the movement data.

In step 406, the driving data analysis server 210 (e.g., an insurance provider server 210 or other organizational server 210) may receive and store the transmitted driving pattern and/or additional driving data from the mobile device 220. In some cases, a server 210 may receive driving patterns and driving data from a plurality of different mobile devices 220. In step 407, the driving data analysis server 210 may analyze the driving pattern data and compare the driving pattern to one or more previously stored driving patterns (e.g., in the driving pattern database 212). Performing the driving pattern matching in step 407 may be similar or identical to the comparison of driving patterns to previous driving patterns in steps 304 and 305, discussed above. For instance, the comparison of observed driving patterns to previously stored driving patterns in step 407 may allow the driving data analysis server 210 to determine a driver, vehicle, and/or other driving factors (e.g., driving time, weather, traffic, passengers, and other factors) associated with the driving trip.

In step 408, the driving data analysis server 210 may update one or more driver records based on the driving data associated with the first driving trip. Updating driver records may include related steps to those discussed above in step 306. For example, if the driving data analysis server 210 corresponds to an insurance provider server 210, than updated the driver records in step 408 may include updating the driver's driver score, offering insurance rate discounts, or suggesting new insurance plans and products that may be advantageous to the driver, based on the received driving data. For instance, existing insurance customers may be offered rate discounts or credits based on the received driving data, while non-customers may be offered specific insurance products and rate quotes as incentives to sign up for a new policy, based on the received driving data. Additionally, although these examples relate to driver records updated by an insurance company, it should be understood that similar systems may be implemented by banks and financial institutions, law enforcement and governmental entities, and various retail entities, to maintain driver data and offer targeted products, services, or incentives based on driving data.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A computing device, comprising:
   one or more hardware memory units; and one or more processors,
   wherein the computing device is configured to access and employ the one or more hardware memory units and the one or more processors to:
      determine a stopping point within raw movement data, wherein determining the stopping point comprises determining, by a movement data analysis software application, that accelerometer data included in the raw movement data indicates an acceleration equal to zero for a duration that exceeds a predetermined minimum time threshold;
      establish, via an internet protocol (IP) connection, communication with one or more roadway infrastructure devices;
      receive, via the IP connection and from the one or more roadway infrastructure devices, additional data related to the determined stopping point;
      determine, based on the additional data related to the determined stopping point, a time interval of data within the raw movement data to be analyzed;
      analyze the determined time interval of data within the raw movement data;
      determine, based on the analyzed determined time interval of data within the raw movement data, a first driving pattern;
      determine, based on the first driving pattern, a first driver of a driving trip; and
      output data corresponding to the first driver and the driving trip.

2. The computing device of claim 1, wherein the raw movement data further comprises at least one of: speed data, or location data, and wherein the computing device further comprises at least one of an accelerometer, speedometer, or Global Positioning System (GPS) receiver, configured to collect the raw movement data.

3. The computing device of claim 2, wherein the computing device is one of a smartphone, tablet computer, or vehicle-based computer system.

4. The computing device of claim 1, wherein determining the stopping point within the raw movement data comprises:
   determining a point within the raw movement data corresponding to a stop sign or stop light encountered during the driving trip.

5. The computing device of claim 1, wherein determining the stopping point within the raw movement data comprises:
   determining a point within the raw movement data corresponding to parking at an end of the driving trip or departing at a beginning of the driving trip.

6. The computing device of claim 1, wherein determining the first driver of the driving trip comprises:
   calculating the first driving pattern based on the analysis of the time interval of data within the raw movement data collected; and
   comparing the first driving pattern to a plurality of previously stored driving patterns associated with a plurality of drivers including the first driver.

7. The computing device of claim 6, wherein comparing the first driving pattern comprises:
   comparing the first driving pattern to a first previously stored driving pattern associated with the first driver and a first vehicle; and
   comparing the first driving pattern to a second previously stored driving pattern associated with the first driver and a second vehicle.

8. The computing device of claim 1, further comprising:
   determining, based on the data, that the first driver is an existing insurance customer; and
   responsive to the determination that the first driver is an existing insurance customer, offering, based on the data, at least one of: rate discounts or credits.

9. The computing device of claim 1, further comprising:
   determining, based on the data, that the first driver is not an existing insurance customer; and
   responsive to the determination that the first driver is not an existing insurance customer, offering, based on the data, at least one of: insurance products and rate quotes.

10. The computing device of claim 1, wherein the one or more roadway infrastructure devices comprise at least one of: a non-vehicle based traffic camera and a road-side traffic monitoring device.

11. The computing device of claim 1, further comprising:
   generating driver summary data corresponding to the first driver based on: the first driver, the first driving pattern, historical driving patterns corresponding to the first driver, and additional driving data corresponding to both the first driving pattern and the historical driving patterns corresponding to the first driver.

12. The computing device of claim 11, wherein outputting the data comprises outputting the driver summary data.

13. The computing device of claim 11, wherein the additional driving data comprises one or more of: turn signal usage, seat belt usage, radio usage, driver distraction data, weather conditions, adaptive cruise control activation, electronic stability control, lane departure activation, and blind spot detector activation.

14. The computing device of claim 11, wherein the driver summary data comprises one or more of: average miles driven per day, week, or month, average driving speed, average driving acceleration, braking patterns, steering patterns, average driving time, turn signal usage patterns, seat belt usage patterns, average driving road conditions, and average weather conditions.

15. The computing device of claim 1, wherein outputting the data comprises: outputting a first subset of the data to a first entity, relevant to the first subset of the data.

16. The computing device of claim 15, wherein the movement data analysis software application corresponds to the first entity, and wherein receiving the raw movement data comprises receiving raw movement data corresponding to the first entity without receiving raw movement data that does not correspond to the first entity.

17. The computing device of claim 16, wherein the movement data analysis software application includes an indication of the raw movement data corresponding to the first entity.

18. The computing device of claim 16, further comprising receiving an additional movement data analysis software application, wherein the additional movement data analysis software application corresponds to the second entity and includes an indication of raw movement data corresponding to the second entity.

19. A method comprising:
at a computing platform comprising at least one processor and memory;
determining a stopping point within raw movement data, wherein determining the stopping point comprises determining, by a movement data analysis software application, that accelerometer data included in the raw movement data indicates an acceleration equal to zero for a duration that exceeds a predetermined minimum time threshold;
establishing, via an internet protocol (IP) connection, communication with one or more roadway infrastructure devices;
receiving, via the IP connection and from the one or more roadway infrastructure devices, additional data related to the determined stopping point;
determining, based on the additional data related to the determined stopping point, a time interval of data within the raw movement data to be analyzed;
analyzing the determined time interval of data within the raw movement data;
determining, based on the analyzed determined time interval of data within the raw movement data, a first driving pattern;
determining, based on the first driving pattern, a first driver of a driving trip; and
outputting data corresponding to the first driver and the driving trip.

20. A system, comprising:
a plurality of movement sensors;
a driving data analysis server; and
one or more mobile computing devices, wherein the driving data analysis server comprises:
one or more processors;
one or more nonvolatile hardware memory units; and
one or more networking components, wherein the driving data analysis server is configured to access and employ the one or more nonvolatile hardware memory units and the one or more processors to:
determine a stopping point within raw movement data, wherein determining the stopping point comprises determining, by a movement data analysis software application, that accelerometer data included in the raw movement data indicates an acceleration equal to zero for a duration that exceeds a predetermined minimum time threshold;
establish, via an internet protocol (IP) connection, communication with one or more roadway infrastructure devices;
receive, via the IP connection and from the one or more roadway infrastructure devices, additional data related to the determined stopping point;
determine, based on the additional data related to the determined stopping point, a time interval of data within the raw movement data to be analyzed;
analyze the determined time interval of data within the raw movement data;
determine, based on the analyzed determined time interval of data within the raw movement data, a first driving pattern;
determine, based on the first driving pattern, a first driver of a driving trip; and
output data corresponding to the first driver and the driving trip.

* * * * *